US011875771B2

(12) United States Patent
McCutcheon

(10) Patent No.: US 11,875,771 B2
(45) Date of Patent: Jan. 16, 2024

(54) AUDIO SYSTEM AND SIGNAL PROCESSING METHOD FOR AN EAR MOUNTABLE PLAYBACK DEVICE

(71) Applicant: ams AG, Premstätten (AT)

(72) Inventor: Peter McCutcheon, Premstaetten (AT)

(73) Assignee: AMS AG, Premstätten (AT)

( * ) Notice: Subject to any disclaimer, the term of this patent is extended or adjusted under 35 U.S.C. 154(b) by 303 days.

(21) Appl. No.: 17/441,017

(22) PCT Filed: Mar. 18, 2020

(86) PCT No.: PCT/EP2020/057502
§ 371 (c)(1),
(2) Date: Sep. 20, 2021

(87) PCT Pub. No.: WO2020/193324
PCT Pub. Date: Oct. 1, 2020

(65) Prior Publication Data
US 2022/0157291 A1 May 19, 2022

(30) Foreign Application Priority Data
Mar. 22, 2019 (EP) .................................... 19164678
Jun. 26, 2019 (EP) .................................... 19182631

(51) Int. Cl.
*G10K 11/178* (2006.01)
*H04R 1/10* (2006.01)

(52) U.S. Cl.
CPC .................. *G10K 11/17854* (2018.01); *G10K 11/17825* (2018.01); *G10K 11/17881* (2018.01);
(Continued)

(58) Field of Classification Search
CPC ............... G10K 2210/3026; G10K 2210/3027
See application file for complete search history.

(56) References Cited

U.S. PATENT DOCUMENTS 4,494,074 A 1/1985 Bose
5,138,664 A 8/1992 Kimura et al.
(Continued)

FOREIGN PATENT DOCUMENTS

EP 3451327 A1 3/2019
EP 3503572 A1 6/2019

OTHER PUBLICATIONS

European Extended Search Report in corresponding EP Application No. 19182631.2 dated Jan. 24, 2020, 9 pages.
(Continued)

*Primary Examiner* — Ping Lee
(74) *Attorney, Agent, or Firm* — MH2 TECHNOLOGY LAW GROUP LLP

(57) ABSTRACT

An audio system for an ear mountable playback device comprises a speaker, an error microphone configured to predominantly sense sound being output from the speaker and a further microphone configured to predominantly sense ambient sound. The system further comprises a first noise filter coupling the further microphone to the speaker, a second noise filter coupling the error microphone to the speaker and an adaptation engine. The adaptation engine is configured to adapt a response of the first noise filter depending on error signals from at least the error microphone, estimate a leakage condition from the response of the first noise filter, and adapt a response of the second noise filter depending on the estimated leakage condition.

19 Claims, 4 Drawing Sheets

(52) U.S. Cl.
CPC ...................... *H04R 1/1083* (2013.01); *G10K 2210/1081* (2013.01); *G10K 2210/3026* (2013.01); *G10K 2210/3027* (2013.01); *G10K 2210/3028* (2013.01); *G10K 2210/3056* (2013.01); *H04R 2460/01* (2013.01)

(56) References Cited

U.S. PATENT DOCUMENTS

| | | | |
|---|---|---|---|
| 8,693,700 | B2 | 4/2014 | Bakalos et al. |
| 9,076,431 | B2 | 7/2015 | Kamath et al. |
| 2010/0303256 | A1 | 12/2010 | Clemow |
| 2014/0072135 | A1 | 3/2014 | Bajic et al. |
| 2015/0161981 | A1 | 6/2015 | Kwatra |
| 2015/0243271 | A1 * | 8/2015 | Goldstein ........ G10K 11/17854 381/71.6 |
| 2015/0310846 | A1 | 10/2015 | Andersen et al. |
| 2016/0300562 | A1 | 10/2016 | Goldstein |
| 2017/0110105 | A1 | 4/2017 | Kumar et al. |

OTHER PUBLICATIONS

International Search Report and Written Opinion in corresponding International Application No. PCT/EP2020/057502 dated Jun. 18, 2020, 13 pages.

* cited by examiner

AUDIO SYSTEM AND SIGNAL PROCESSING METHOD FOR AN EAR MOUNTABLE PLAYBACK DEVICE

CROSS-REFERENCE TO RELATED APPLICATIONS

The present application is the national stage entry of International Patent Application No. PCT/EP2020/057502, filed on Mar. 18, 2020, and published as WO 2020/193324 A1 on Oct. 1, 2020, which claims the benefit of priority of European Patent Application Nos. 19164678.5, filed on Mar. 22, 2019, and 19182631.2, filed on Jun. 26, 2019, all of which are incorporated by reference herein in their entirety.

FIELD OF THE INVENTION

The present disclosure relates to an audio system and to a signal processing method, each for an ear mountable playback device, e.g. a headphone, comprising a speaker.

BACKGROUND OF THE INVENTION

Nowadays a significant number of headphones, including earphones, employ techniques that enhances the sound experience of a user, such as noise cancellation techniques. For example, such noise cancellation techniques are referred to as active noise control or ambient noise cancellation, both abbreviated with ANC. ANC generally makes use of recording ambient noise that is processed for generating an anti-noise signal, which is then combined with a useful audio signal to be played over a speaker of the headphone. ANC can also be employed in other audio devices like handsets or mobile phones.

Various ANC approaches make use of feedback, FB, microphones, feedforward, FF, microphones or a combination of feedback and feedforward microphones. Efficient FF and FB ANC is achieved by tuning a filter or by adjusting an audio signal, e.g. via an equalizer, based on given acoustics of a system.

Hybrid noise cancellation headphones are generally known. For instance, a microphone is placed inside a volume that is directly acoustically coupled to the ear drum, conventionally close to the front of the headphones driver. This is referred to as the feedback (FB) microphone. A second microphone, the feed-forward (FF) microphone is placed on the outside of the headphone, such that it is acoustically decoupled from the headphones driver.

For each system to work effectively, the headphone preferably makes a near perfect seal to the ear/head which does not change whilst the device is worn and that is consistent for any user. Any change in this seal as a result of a poor fit will change the acoustics and ultimately the ANC performance. This seal is typically between the ear cushion and the user's head, or between an earphone's rubber tip and the ear canal wall.

For most noise cancellation headphones and earphones, effort is put into maintaining a consistent fit when being worn and from user to user to ensure that the headphone acoustics do not change and always have a good match to the noise filters. However, "leaky" earphones and headphones, which do not make a seal between the ear cushion/tips and the ear, have a large variation in the acoustics when worn by different people. Furthermore the acoustics can vary for the user whilst the earphone moves in their ear as a result of typical everyday head movements. Therefore, for any headphones or earphones which are leaky, some adaptation is required to ensure that the filters always match the acoustics.

Some headphones and earphones already feature some form of off-ear detection, i.e. a detection whether the headphone is worn by a user or not. Typically this is achieved by several means including optical proximity sensors, pressure sensors and capacitive sensors. However, the off-ear detection merely is able to distinguish between two extreme states of acoustic leakage, i.e. whether the headphone is on the ear or off the ear. Moreover, the listed solutions all require adding an extra sensor into the device solely for this purpose.

SUMMARY OF THE INVENTION

An objective to be achieved is to provide an improved concept for detecting an acoustical leakage of an ear mountable playback device like a headphone, earphone or mobile handset.

This object is achieved with the subject matter of the independent claims. Embodiments and developments of the improved concept are defined in the dependent claims.

The improved concept is based on the idea of estimating a leakage condition in terms of its extent, such that the gained estimate can consequently be used to enhance the sound experience of the user, i.e. removing unwanted portions of a sound signal transmitted to the ear canal of the user. This enhancement can be achieved by adjusting a noise control algorithm based on the estimated leakage condition, for instance. For example, FF and FB filters of a hybrid noise canceling headset may be tuned depending on the extent of the acoustic leakage.

In contrast, at present tuning of the aforementioned filters is only performed once during or at the end of production of the ANC devices, for example by measuring acoustic properties of the device. In particular, tuning is performed during a calibration process with some measurement fixture like an artificial head with a microphone in the ear canal of the artificial head. The measurement, including the playing of some test sound, is coordinated from some kind of processing device which can be a personal computer or the like. To achieve an optimum ANC performance for each ANC device produced, a dedicated measurement has to be performed for each of the ANC devices under control of the processing device, which is time-consuming, especially if larger volumes of ANC devices are to be calibrated.

Moreover, to date FB ANC has not been implemented into leaky earphones and headphones, where there can be a highly variable acoustic leak between the front volume and the ambient environment. Implementing FB ANC as a fixed, i.e. non-adaptive, system into these playback devices would lead to poor or even nonexistent noise cancellation in the presence of a significant leak around the earphone. Therefore, only adaptive FB ANC is feasible for leaky playback devices. However, conventional adaptive processes that are known for FF ANC systems cannot be applied to FB ANC systems as a FB ANC system by nature is likely to become unstable upon variation of the acoustic leak.

In an embodiment of an audio system according to the improved concept, which is to be used for an ear mountable playback device like a headphone, earphone, mobile phone, handset or the like, this system comprises a speaker, an error microphone that is configured to predominantly sense sound being output from the speaker but also some ambient sound, and a further microphone which is configured to predominantly sense ambient sound. The audio system further comprises a first noise filter coupling the further microphone to the speaker, a second noise filter coupling the error microphone to the speaker, and an adaptation engine.

In the following, the improved concept will be explained, sometimes referring to a headphone or earphone as an example of the playback device. However, it shall be appreciated that this example is not limiting and will also be understood by a skilled person for other kinds of playback devices where different leakage conditions can occur during usage by a user. In general the term playback device should include all types of audio reproducing devices.

For example, the speaker of the audio system is arranged in a housing of the playback device such that a first volume is arranged on the preferential side for sound emission of the speaker. The housing may have an opening for coupling the first volume to the ear canal volume of the user. The housing may further comprise a front vent that is covered with an acoustic resistor and couples the first volume to the ambient environment. The front volume will also be coupled to the ambient environment via an acoustic leakage due to an imperfect fit of the earphone to the ear of the user. This acoustic leakage varies from person to person and depends on how the earphone sits in the ear at a specific time. The error microphone is arranged within the first volume such that it detects sound output from the speaker as well as ambient sound. For example, it is arranged close to the opening.

In addition, a second volume is arranged within the housing on the side of the speaker facing away from the preferential side for sound emission. The second volume is acoustically coupled to the ambient environment via a rear vent of the housing which may also be covered with an acoustic resistor. The further microphone is for example arranged outside of the rear volume, i.e. at the outside of the housing, in order to predominantly sense ambient sound.

The adaptation engine is configured to adapt a response of the first noise filter depending on error signals from at least the error microphone, to estimate a leakage condition from the response of the first noise filter, and to adapt a response of the second noise filter depending on the estimated leakage condition.

In some implementations, the audio system is configured to perform noise cancellation. For example, the further microphone is a FF microphone and the first noise filter is of a FF noise cancellation type. Moreover, the error microphone is a FB microphone and the second noise filter is of a FB noise cancellation type.

In such a system, the FF microphone is arranged within the headphone or on its outside, such that it predominantly senses ambient sound, and preferably only negligible portions of sound output by the speaker. The FB microphone on the other hand is arranged within the headphone such that it senses sound output by the speaker and ambient sound. For providing the FF ANC, the adaptation engine in this case is configured to record an error signal from the FB error microphone and to adjust the response of the FF filter that is coupled between the FF microphone and the speaker. Optionally, the adaptation engine is further configured to adjust the response of the FF filter also depending on a signal from the FF microphone.

In detail, FF ANC requires matching a filter F to a target acoustic response:

$$F = \frac{AE}{AFFM \cdot DE},$$

wherein AE is the ambience to ear acoustic transfer function, AFFM is the ambience to FF microphone transfer function, and DE is the driver, or speaker, to ear transfer function.

From the adjusted response of the FF filter, e.g. from an amplitude of the FF filter, the adaptation engine obtains leakage condition information that characterizes the acoustic leakage of the playback device, for example caused by a variable placement of the playback device within an ear of the user. For example, a low gain FF filter response indicates a small acoustic leak while a high gain FF filter response constitutes a large acoustic leak.

Consequently, the adaptation engine then adjusts the response of the FB filter based on the gained leakage condition. This way, and adaptive FB ANC is realized, in which the response of the FB filter is adapted whenever the acoustic leakage changes. In detail, the FB ANC can be calculated by:

$$ANC_{FB} = \frac{1}{1 + B \cdot DFBM},$$

wherein B is the response of the FB filter coupling the FB microphone to the speaker, and DFBM is the acoustic driver to FB microphone transfer function. Adjusting the response of the FB filter based on a state of the FF filter as described provides an efficient solution of hybrid ANC with both an adaptive FF and an adaptive FB loop.

For a leaky ANC playback device, the described FB loop response may change rapidly based on the varying acoustic leakage, and therefore the driver response, and the response of the FB filter. In contrast to conventional systems, particularly to systems that independently adapt both the FB ANC and the FF ANC, the improved concept prevents the FB filter adaptation from going unstable along the path to a targeted stable state. In addition, adapting the FB ANC in dependence of an already adaptive FF ANC has the advantage of being resource conservative by minimizing processing, which may be advantageous particularly for battery powered wireless devices.

In some further implementations, the adaptation engine is further configured to evaluate the performance of the noise cancellation by determining an energy ratio between a signal of the error microphone and a signal of the further microphone.

An approximation of the ANC is performed by monitoring the energy at the FB microphone relative to the energy at the FF microphone. For instance, the ANC performance approximation is equal to the energy of the FB signal divided by the energy of the FF signal. This way, a threshold may be defined for initiating the adaptation engine to adapt the second noise filter.

In some implementations, the adaptation engine is further configured to compare a signal level of the further microphone to a signal level of the error microphone, and to evaluate an accuracy of the estimated leakage condition based on the comparison of the signal levels.

For example, the ratio of the signal levels that for example corresponds to a performance of an ANC process may indicate whether the estimated leakage condition is accurate.

In some further embodiments, the adaptation engine is further configured to activate and deactivate the second noise filter depending on the accuracy of the estimated leakage condition.

Deactivating the second noise filter may be required in order to avoid instabilities, for example if the estimated leakage condition does not correspond to an actual leakage condition, i.e. if the estimated leakage condition is inaccurate.

In some implementations, the leakage condition characterizes an acoustic leak between an ambient of the audio system and a volume which is defined by an ear canal of a user and a cavity of the audio system, wherein the cavity is arranged at a preferential side for sound emission of the speaker.

"Leaky" earphone designs are often preferred as they are relatively compact and comfortable to wear while at the same time still providing a desirable level of sound performance to the user. However, these earphone designs do not fully seal the inner volume of the earphone and the ear canal from the ambient environment. For efficient ANC processes, the resulting acoustic leakage has to be characterized accurately in order to achieve the desirable performance of the ANC.

In some implementations, the adaption engine is configured to estimate the leakage condition by comparing the adapted response of the first noise filter to a predetermined minimum and/or maximum response.

During the design or calibration procedure, i.e. ex-factory, a minimum leak acoustic transfer function and a maximum leak acoustic transfer function may be predetermined for the playback device. The predetermined minimum for example corresponds to a low leak or no leakage, while the predetermined maximum corresponds to a high leak or a playback device that is not on the ear of the user.

An amplitude response of the first noise filter may then be compared to the predetermined minimum and maximum response, from which the leakage condition can be obtained. For example, the adapted response of the first noise filter being close to the predetermined minimum response indicates a small acoustic leakage. Analogously, the adapted response of the first noise filter being close to the predetermined maximum response corresponds to a large acoustic leakage.

In some further implementations, comparing the adapted response of the first noise filter to the predetermined minimum and/or maximum response is performed in the frequency domain.

In some implementations, the adaptation engine is configured to estimate the leakage condition at one or more distinct frequencies or frequency ranges.

Typically, amplitude responses filters are evaluated only in the frequency band of interest, e.g. the audio frequency band. Therefore, the adaptation engine in these implementations is configured to only evaluate and compare the filter responses in said frequency band of interest and to ignore the filter responses outside of this band for instance. For example, the filter response is only evaluated and compared to the predetermined responses between 100 Hz and 1 kHz.

For example, the adaptation engine evaluates and compares the adapted FF filter response to the predetermined minimum and/or maximum response at a number of distinct frequencies, for example at at least three distinct frequencies within the audio band. The amplitude of the adapted FF filter response is monitored at at least three frequencies and averaged. This amplitude is then compared to the predefined maximum and/or minimum leakage response averaged over the same at least three frequencies. The result of this comparison is consequently used to determine the leakage condition of the system.

In some implementations, the adaptation engine is configured to estimate the leakage condition by determining a leakage value.

A convenient way of describing the leakage condition and adjusting the FB filter based on the leakage condition is the determination of an actual leakage value that quantifies the acoustic leakage condition. This leakage value may for example be a value between 0 and 1, wherein 0 indicates the smallest possible acoustic leakage or no leak and 1 indicates the largest acceptable acoustic leakage, i.e. if the playback device has a very large leak between the front volume and ambient environment.

In some further implementations, the adaptation engine is further configured to estimate the leakage condition by estimating at each of a set of distinct frequencies or frequency ranges an interim leakage value based on an amplitude value of the response of the first noise filter within a range that is defined by the predetermined minimum and maximum responses at the respective distinct frequency or frequency range. Furthermore, the adaptation engine in these implementations is further configured to calculate the leakage value from the interim leakage values.

In order to gain a more accurate result for the leakage value describing the leakage condition, interim leakage values can be determined as a first step. Determining the interim leakage values for example means determining one interim leakage value at each distinct frequency by comparing the adapted FF filter response to the predetermined minimum and/or maximum response at said frequency. The targeted leakage value may then be a function of the interim leakage values. For example, the leakage value is calculated as a mean value of the interim leakage values.

In some implementations, a threshold may be defined at which the adaptation engine initiates an adaptation of the response of the second noise filter.

For example, as an ANC performance may move rapidly around the threshold due to small variations in the leakage condition over time, the single threshold may also be replaced by two thresholds in order to create a hysteresis behavior of the initiation of an adaption by means of the adaptation engine.

In some implementations, the adaptation engine is configured to adapt the response of the second noise filter by setting one of a set of predefined filters as the second noise filter.

For example, the second noise filter is a parallel arrangement of two parallel filters with different filter coefficients. The adaptation engine in such embodiments is configured to select either parallel filter as the second noise filter by setting an adjustable gain of one of the parallel filters, i.e. the active parallel filter, to 1 and an adjustable gain of the other parallel filter, i.e. the inactive parallel filter, to 0. Furthermore, a memory of the audio system stores several filter coefficient sets, e.g. at least 10 coefficient sets, corresponding to distinct predefined filters that may be suitable for different acoustical leakage conditions. For example, each of the set of predefined filters is assigned to a distinct leakage condition. The adaptation engine is then further configured to load such predefined filters as the parallel filters. For example, the adaptation engine loads a predefined filter as the parallel filter that has a momentary adjustable gain of 0, i.e. the inactive parallel filter.

For example, if the leakage condition changes an alternative predefined filter may become a more suitable second noise filter. Hence, the adaptation engine in this situation loads the new filter coefficient corresponding to the new suitable predefined filter as the inactive parallel filter and subsequently switches the adjustable gains of the parallel filters such that the newly loaded parallel filter becomes the second noise filter, while the other parallel filter now has an adjustable gain of 0 and therefore becomes the inactive parallel filter. Filter coefficients of the latter may then be modified by the adaptation engine in the same manner, for example upon the detection of a further change of the leakage condition and determination of a new suitable one of the set of predefined filters.

In some further implementations, the adaptation engine is further configured to adapt the response of the second noise filter by selecting a subsequent one of the set of predefined filters depending on a currently selected second noise filter.

In order to prevent FB ANC to become unstable as a result of drastic changes of the response of the second noise filter, or FB filter, for example, the adaptation engine may be configured to only change filter coefficients in small steps, i.e. set the predefined filter as the second noise filter that is adjacent to the currently selected second noise filter in terms of leakage condition. For example, each predefined filter of the set of predefined filters is assigned to a distinct leakage value describing the leakage condition and the set of predefined filters can hence be sorted in terms of this assigned leakage value.

For example, if the currently selected second noise filter corresponds to a leakage value of 0.3 and a change in the leakage condition requires switching to the predefined filter corresponding to a leakage value of 0.5, the adaptation engine may be configured to in a first step set the predefined filter corresponding to a leakage value of 0.4 as the second noise filter and in a second step set the predefined filter corresponding to a leakage value of 0.5 as the second noise filter. In certain systems, this may significantly reduce the risk of reaching an instability due to a sudden and significant change of a filter response, such as a feedback filter response.

In some implementations, the adaptation engine is further configured to adapt the response of the second noise filter by setting a subsequent one of the set of predefined filters by fading, in particular cross-fading, from a currently selected second noise filter to the subsequent one of the set of predefined filters.

In order to assure a smooth transition when switching from one filter to the subsequent one, the adaptation engine may be configured to change to the subsequent filter of the set of predefined filters by means of fading. For example, the filter of the set of predefined filters that is currently selected as the second noise filter is gradually faded out by means of gradually reducing its adjustable gain from 1 to 0, while the subsequent one of the set of predefined filters is gradually faded in, i.e. its adjustable gain is gradually increased from 0 to 1. This procedure is commonly referred to as cross-fading. Changing the filters by the described fading may assist in preventing noise cancellation processes from reaching an instability due to a sudden change of filter responses.

In some further implementations, the adaptation engine is further configured to adapt the response of the second noise filter by adjusting a global gain during the fading.

In addition to fading the predefined filters by fading out and fading in via their respective adjustable gains, a global adjustable gain may be used for global fading and/or for globally activating and deactivating the second noise filter. For example, the global adjustable gain could be set to a value smaller than 1, or even to 0, if a fading operation as described above takes place in order to further reduce the risk of instabilities during a change of the response of the second noise filter. After completion of the changing operation, i.e. of the exemplary cross-fading operation, the global adjustable gain may be set back to 1, meaning that the second noise filter is fully activated after the switching. For example, in case of an FB ANC process upon the detection of a sub optimal currently set second noise filter, a global adjustable gain of e.g. 0.8 could be set as the FB ANC is already performing sub optimally and the described reduction of the global adjustable gain only insignificantly further reduces the performance.

In various embodiments, the adaptation engine may be configured to interpolate between a high leak and a low leak filter depending on a leakage condition as detailed in ams application EP17189001.5.

In some implementations, the audio system further comprises a combiner that is configured to generate the response of the second noise filter based on a combination of an output of a first interpolation filter amplified with a first adjustable gain factor and an output of a second interpolation filter amplified with a second adjustable gain factor. The adaption engine in these implementations is further configured to adapt to the response of the second noise filter by adjusting at least one of the first and the second adjustable gain factors.

For example, the second noise filter is a result of an interpolation between two interpolation filters, namely the first and the second interpolation filter. For example, the first interpolation filter is optimized for a low leakage condition, e.g. a leakage value of 0, while the second interpolation filter is optimized for high leakage condition, e.g. a leakage value of 1. Accordingly, the two interpolation filters in this example are tuned by means of the adaptation engine controlling the combiner such that for a maximum leakage condition, the first adjustable gain factor is set to 0 and the second adjustable gain factor is set to 1. Correspondingly, for a minimum leakage condition, the first adjustable gain factor is set to 1 and the second adjustable gain factor is set to 0.

For intermediate leakage conditions, the adaptation engine controls the combiner to set the first and the second adjustable gain factors according to the estimated leakage condition. For example, the second adjustable gain factor in the example described is configured to be set equal to an estimated leakage value, while the first adjustable gain factor is configured to be set equal to 1 minus the estimated leakage value. The leakage value in this example describes a degree of the leakage condition, wherein 0 corresponds to no or minimum acoustic leakage and 1 corresponds to a maximum acoustic leakage. As this way both the first and the second adjustable gain are limited between 0 and 1, both gains will always sum to 1, hence not causing any instability. The design of the first and the second interpolation filters is such that any combination of gains set by the leakage value cannot go unstable for the designated leakage setting.

In some implementations, the audio system may comprise more than two interpolation filters that are combined to result in the second noise filter.

In some further implementations, the combiner is further configured to generate the response of the second noise filter based on the combination amplified with a supplementary adjustable gain factor. The adaptation engine in these implementations is further configured to adapt the response of the second noise filter by adjusting the supplementary adjustable gain factor.

As described above, a supplementary adjustable gain factor as a global gain factor for the second noise filter also in these implementations may further reduce the risk of instabilities during a change of the response of the second noise filter. For example, the supplementary adjustable gain factor is set to a value smaller than 1 while the adaptation engine adapt the first and the second adjustable gain of the interpolation filters.

In some implementations, the adaptation engine is configured to adapt the response of the second noise filter such that a stable operation of the response of the second noise filter is maintained.

For example, the response of the second noise filter is generated by means of a gain factor, such as a global gain factor according to one of the implementations described above. A stability criterion for the operation of the second noise filter in such implementations may be that the product of the acoustic transfer function, i.e. the transfer function from the speaker to the error microphone, and the response of the second noise filter, i.e. the gain factor, is less than 1 at frequencies where the loop phase flips, i.e. exceeds ±180°. The global gain may be set to 0 until a stable operation of the second noise filter is possible.

Alternatively, for implementations in which the response of the second noise filter is generated based on a combination of multiple filters, such as interpolation filters according to one of the implementations described above, a stability criterion for the operation of the second noise filter in such implementations may be that the adjustable gain factors sum to a value smaller than or equal to 1 at all times. Furthermore, if the response of the second noise filter is adjusted by setting one of a set of predefined filters as the second noise filter as described above, stability may be maintained by setting an intermediate stage between two adjacent ones of the set of predefined filters as the second noise filter. The intermediate stage is for example an intermediate filter characterized by a response smaller than a currently selected second noise filter and larger than the subsequent second noise filter, i.e. a selected one of the set of predefined filters.

In some implementations, the audio system further comprises a proximity sensor that is configured to detect a proximity between the audio system and an ear canal of the user.

Therein, the adaptation engine is further configured to estimate the leakage condition from the response of the first noise filter and the proximity.

To enhance the accuracy of the estimated leakage condition, an additional proximity sensor may be employed to independently estimate a second leakage condition, which can be compared to the estimated leakage condition estimated from the response of the first noise filter in order to evaluate the accuracy. Likewise, the estimated leakage condition and the second estimated leakage condition may be combined to generate a better approximation of the actual leakage condition.

In some embodiments, the audio system includes the playback device. Moreover, in some embodiments the adaptation engine is included in a housing of the playback device. The playback device may be a headphone or an earphone, in particular a "leaky" headphone or earphone.

Further embodiments of the methods become apparent to a person skilled in the art from the implementations of the audio system described above.

BRIEF DESCRIPTION OF THE DRAWINGS

The improved concept will be described in more detail in the following with the aid of drawings. Elements having the same or similar function bear the same reference numerals throughout the drawings. Hence their description is not necessarily repeated in following drawings.

In the drawings.

DETAILED DESCRIPTION

Figure 1:
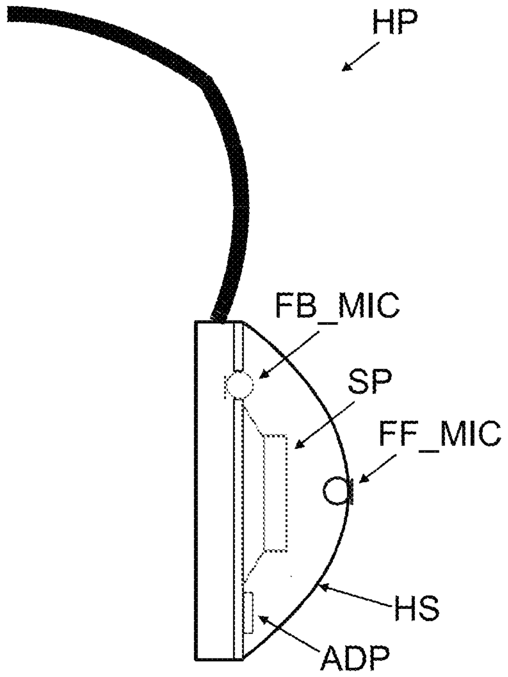
FIG. 1 shows a schematic view of a headphone.

FIG. 1 shows a schematic view of an ANC enabled playback device in form of a headphone HP that in this example is designed as an over-ear or circumaural headphone. Only a portion of the headphone HP is shown, corresponding to a single audio channel. However, extension to a stereo headphone will be apparent to the skilled reader. The headphone HP comprises a housing HS carrying a speaker SP, a feedback noise microphone or error microphone FB_MIC and an ambient noise microphone or feedforward microphone FF_MIC. The error microphone FB_MIC is particularly directed or arranged such that it records both ambient noise and sound played over the speaker SP. Preferably the error microphone FB_MIC is arranged in close proximity to the speaker, for example close to an edge of the speaker SP or to the speaker's membrane. The ambient noise/feedforward microphone FF_MIC is particularly directed or arranged such that it mainly records ambient noise from outside the headphone HP.

Depending on the type of ANC to be performed, the ambient noise microphone FF_MIC may be omitted, if only feedback ANC is performed. The error microphone FB_MIC may be used according to the improved concept to provide an error signal being the basis for a determination of the wearing condition, respectively leakage condition, of the headphone HP, when the headphone HP is worn by a user.

In the embodiment of FIG. 1, an adaptation engine ADP is located within the headphone HP for performing various kinds of signal processing operations, examples of which will be described within the disclosure below. The adaptation engine ADP may also be placed outside the headphone HP, e.g. in an external device located in a mobile handset or phone or within a cable of the headphone HP.

Figure 2:
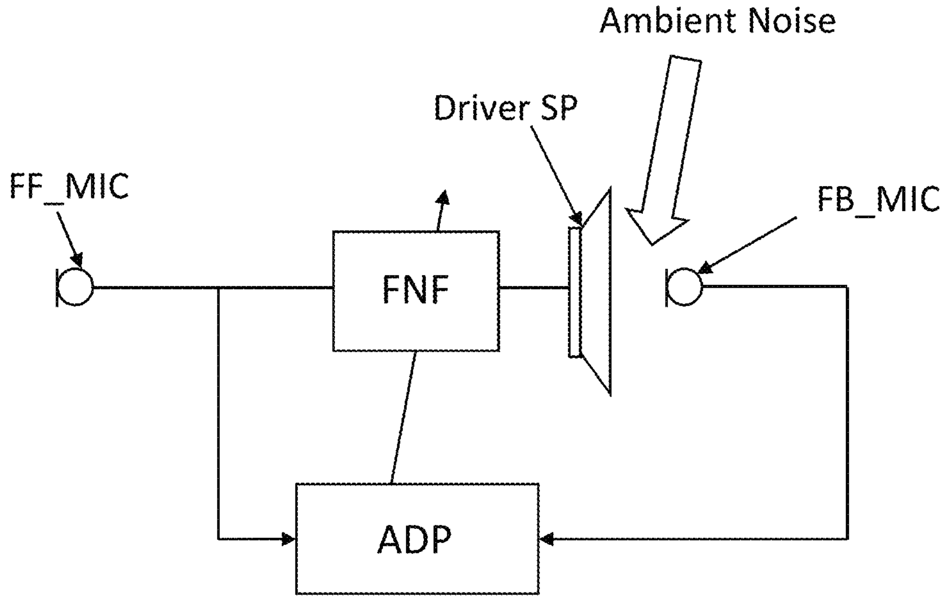
FIG. 2 shows a block diagram of a generic adaptive ANC system.

FIG. 2 shows a block diagram of a generic adaptive ANC system. The system comprises the error microphone FB_MIC and the feedforward microphone FF_MIC, both providing their output signals to the adaptation engine ADP. The noise signal recorded with the feedforward microphone FF_MIC is further provided to a feedforward filter FNF for generating an anti-noise signal being output via the speaker SP. At the error microphone FB_MIC, the sound being output from the speaker SP combines with ambient noise and is recorded as an error signal that includes the remaining portion of the ambient noise after ANC. This error signal is used by the sound adaptation engine ADP for adjusting a filter response of the feedforward filter.

Figure 3:
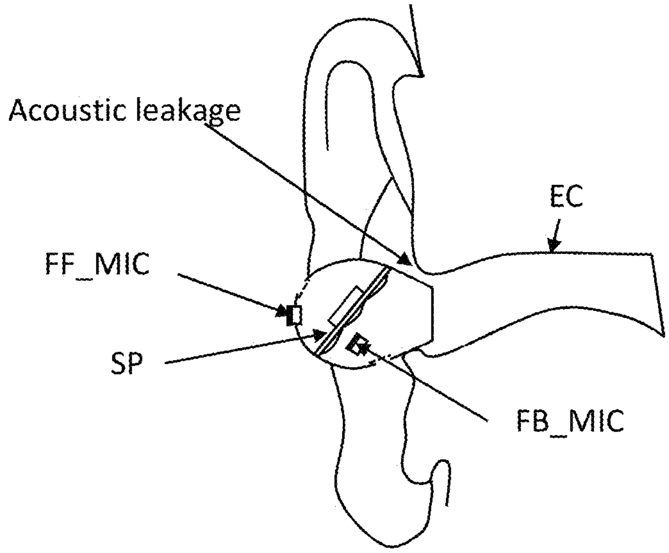
FIG. 3 shows an example representation of a "leaky" type earphone.

FIG. 3 shows an example representation of a "leaky" type earphone, i.e. an earphone featuring some leakage between the ambient environment and the ear canal EC. In particular, a sound path between the ambient environment and the ear canal EC exists, denoted as "acoustic leakage" in the drawing.

Figure 4:
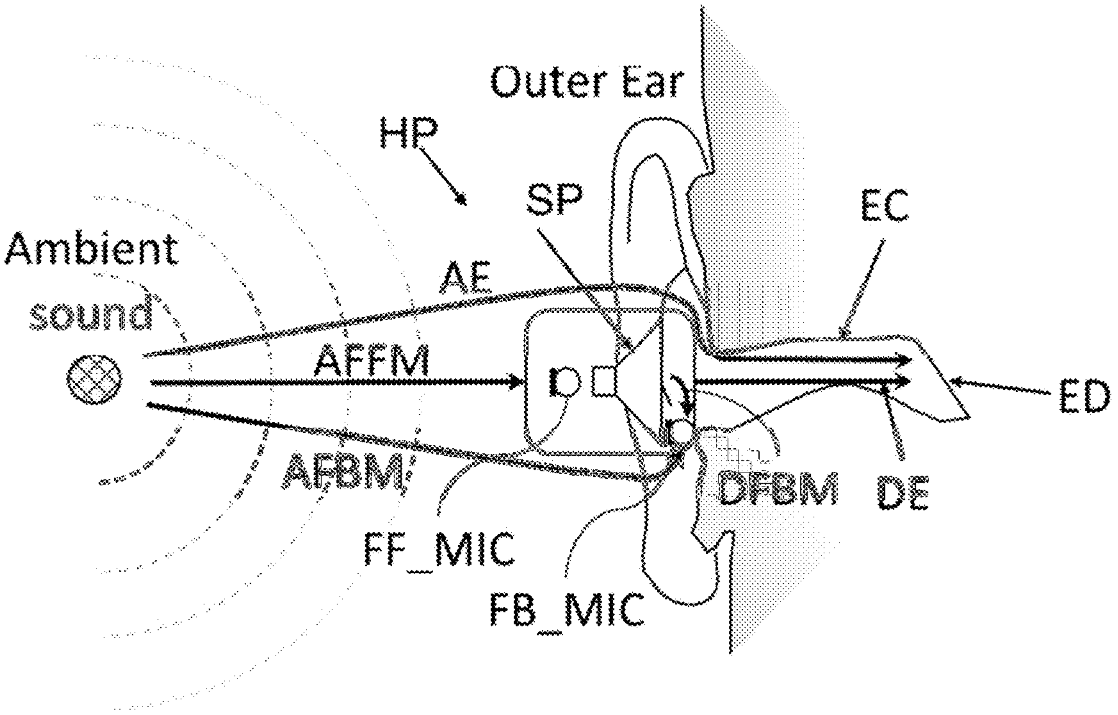
FIG. 4 shows an example headphone worn by a user with several sound paths from an ambient sound source.

FIG. 4 shows an example configuration of a headphone HP worn by a user with several sound paths. The headphone HP shown in FIG. 4 stands as an example for any ear mountable playback device of a noise cancellation enabled audio system and can e.g. include in-ear headphones or earphones, on-ear headphones or over-ear headphones. Instead of a headphone, the ear mountable playback device could also be a mobile phone or a similar device.

The headphone HP in this example features a loudspeaker SP, a feedback noise microphone FB_MIC and, optionally, an ambient noise microphone FF_MIC, which e.g. is designed as a feedforward noise cancellation microphone. Internal processing details of the headphone HP are not shown here for reasons of a better overview.

In the configuration shown in FIG. 4, several sound paths exist, of which each can be represented by a respective acoustic response function or acoustic transfer function. For example, a first acoustic transfer function DFBM represents a sound path between the speaker SP and the feedback noise microphone FB_MIC, and may be called a driver-to-feedback response function. The first acoustic transfer function DFBM may include the response of the speaker SP itself. A second acoustic transfer function DE represents the acoustic sound path between the headphone's speaker SP, potentially including the response of the speaker SP itself, and a user's eardrum ED being exposed to the speaker SP, and may be called a driver-to-ear response function. A third acoustic transfer function AE represents the acoustic sound path between the ambient sound source and the eardrum ED through the user's ear canal EC, and may be called an ambient-to-ear response function. A fourth acoustic transfer function AFBM represents the acoustic sound path between the ambient sound source and the feedback noise microphone FB_MIC, and may be called an ambient-to-feedback response function.

If the ambient noise microphone FF_MIC is present, a fifth acoustic transfer function AFFM represents the acoustic sound path between the ambient sound source and the ambient noise microphone FF_MIC, and may be called an ambient-to-feedforward response function.

Response functions or transfer functions of the headphone HP, in particular between the microphones FB_MIC and FF_MIC and the speaker SP, can be used with a feedback filter function B and feedforward filter function FNF, which may be parameterized as noise cancellation filters during operation.

The headphone HP as an example of the ear-mountable playback device may be embodied with both the microphones FB_MIC and FF_MIC being active or enabled such that hybrid ANC can be performed, or as a FB ANC device, where only the feedback noise microphone FB_MIC is active and an ambient noise microphone FF_MIC is not present or at least not active. Hence, in the following, if signals or acoustic transfer functions are used that refer to the ambient noise microphone FF_MIC, this microphone is to be assumed as present, while it is otherwise assumed to be optional.

Any processing of the microphone signals or any signal transmission are left out in FIG. 4 for reasons of a better overview. However, processing of the microphone signals in order to perform ANC may be implemented in a processor located within the headphone or other ear-mountable playback device or externally from the headphone in a dedicated processing unit. The processor or processing unit may be called an adaptation engine. If the processing unit is integrated into the playback device, the playback device itself may form a noise cancellation enabled audio system. If processing is performed externally, the external device or processor together with the playback device may form the noise cancellation enabled audio system. For example, processing may be performed in a mobile device like a mobile phone or a mobile audio player, to which the headphone is connected with or without wires.

In the various embodiments, the FB or error microphone FB_MIC may be located in a dedicated cavity, as for example detailed in ams application EP17208972.4.

Figure 5:
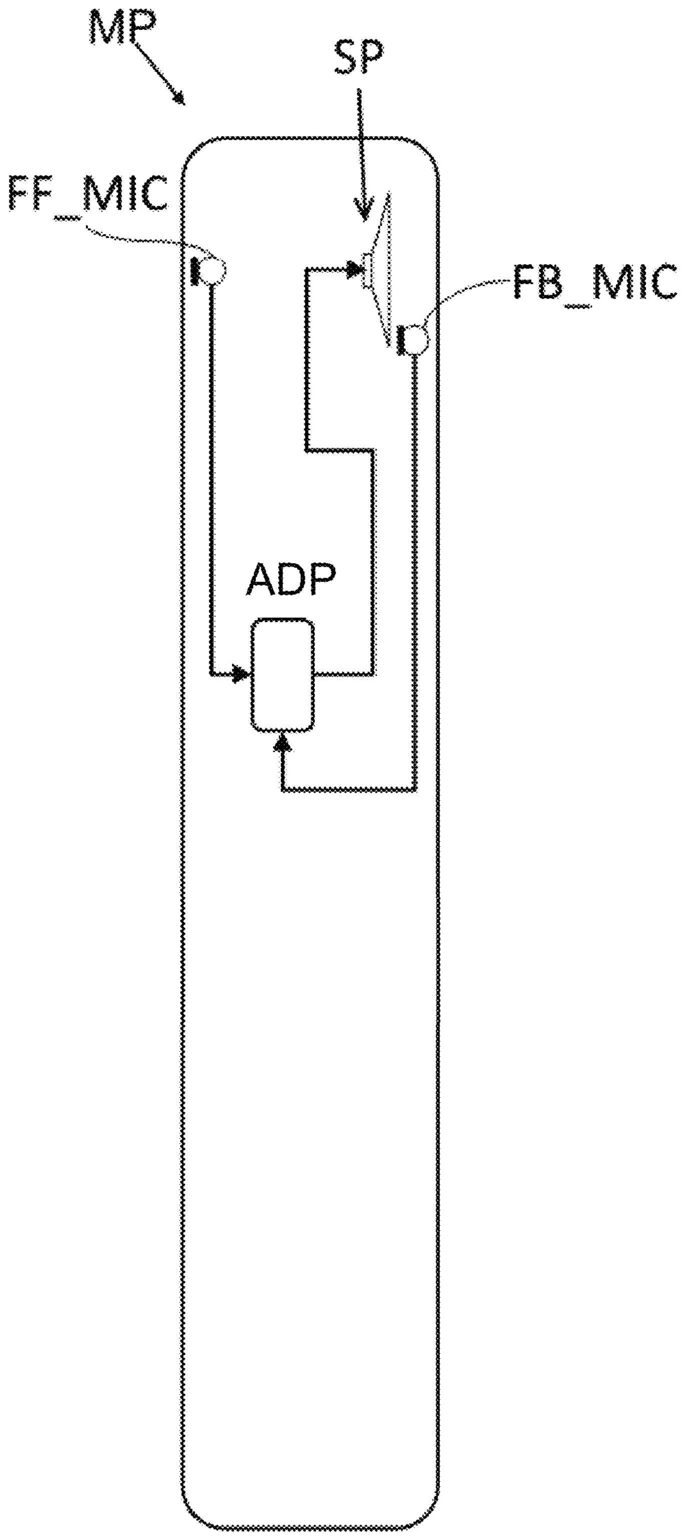
FIG. 5 shows an example representation of an ANC enabled handset.

Referring now to FIG. 5, another example of a noise cancellation enabled audio system is presented. In this example implementation, the system is formed by a mobile device like a mobile phone MP that includes the playback device with speaker SP, feedback or error microphone FB_MIC, ambient noise or feedforward microphone FF_MIC and an adaptation engine ADP for performing inter alia ANC and/or other signal processing during operation.

In a further implementation, not shown, a headphone HP, e.g. like that shown in FIG. 1 or FIG. 4, can be connected to the mobile phone MP wherein signals from the microphones FB_MIC, FF_MIC are transmitted from the headphone to the mobile phone MP, in particular the mobile phone's processor PROC for generating the audio signal to be played over the headphone's speaker. For example, depending on whether the headphone is connected to the mobile phone or not, ANC is performed with the internal components, i.e. speaker and microphones, of the mobile phone or with the speaker and microphones of the headphone, thereby using different sets of filter parameters in each case.

In the following, several implementations of the improved concept will be described in conjunction with specific use cases. It should however be apparent to the skilled person that details described for one implementation may still be applied to one or more of the other implementations.

Figure 6:
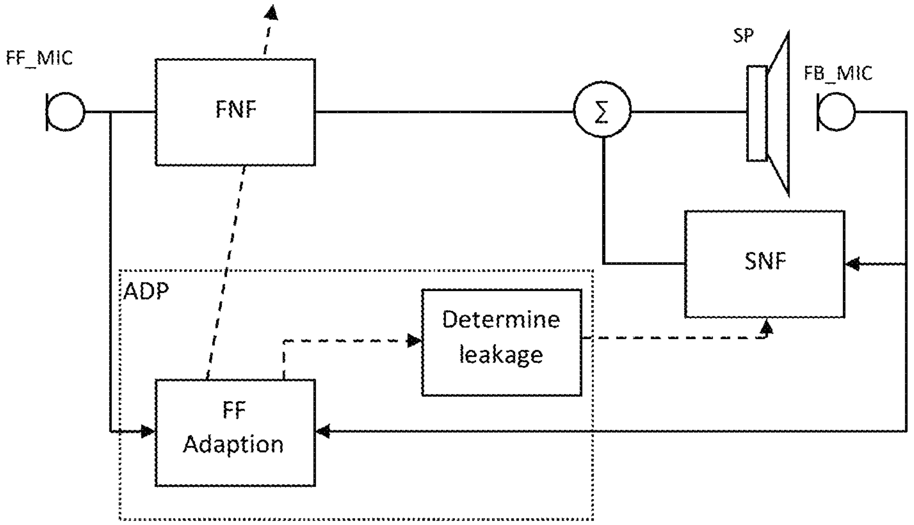
FIG. 6 shows a block diagram of an adaptive hybrid ANC system according to the improved concept.

FIG. 6 shows a block diagram of an adaptive hybrid ANC system according to the improved concept. The system comprises the error microphone FB_MIC and the feedforward microphone FF_MIC, both providing their output signals to the adaptation engine ADP. The noise signal recorded with the feedforward microphone FF_MIC is further provided to a feedforward type first noise filter FNF for generating an anti-noise signal being output via the speaker SP. At the error microphone FB_MIC, the sound being output from the speaker SP combines with ambient noise and is recorded as an error signal that includes the remaining portion of the ambient noise after ANC. This error signal is output to a feedback type second noise filter SNF for generating a further anti-noise signal being summed to the anti-noise signal and also output via the speaker SP. The error signal is further provided to the sound adaptation engine ADP for adjusting a filter response of the feedforward filter FNF.

Furthermore, the adjusting of the feedforward filter FNF is further used to determine a leakage condition. For example, a response of the feedforward filter FNF is evaluated and compared to a known leakage condition in order to determine a leakage value quantifying the leakage condition of the earphone. Consequently, the leakage value is used by the adaptation engine ADP to adjust a filter response of the feedback filter SNF.

Figure 7:
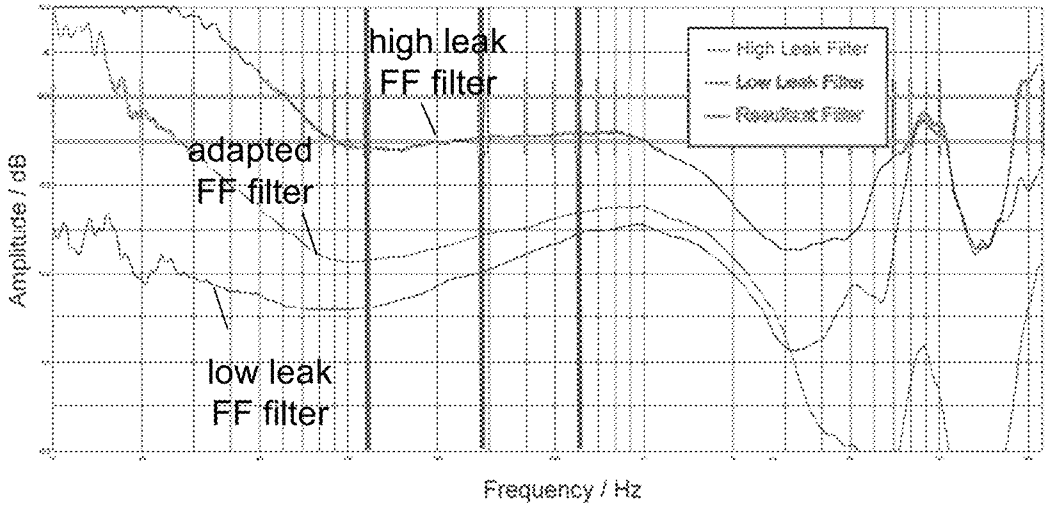
FIG. 7 shows a signal diagram displaying the amplitude responses of an adapted noise filter.

FIG. 7 shows a signal diagram displaying the amplitude of the response of an adapted FF filter together with a predetermined or precalculated low leak, i.e. minimum, and high leak, i.e. maximum, filter response in dependence of frequency. For example, the low leak FF filter response corresponds to no leak, i.e. an on-ear state with no acoustic leakage between the ear canal and the ambient environment, and the high leak FF filter response corresponds to a maximum, i.e. a state with a large acoustic leakage between the ear canal and the ambient environment. An adaptation of the FF filter for intermediate leakage condition then results in a filter response in between these two predetermined responses, as shown for an exemplary response of an adapted FF filter. For example, the typical range of possible amplitudes for the FF filter response between minimum and maximum is in the order of 15 dB.

The adaptation engine ADP may be configured to evaluate the response of the adapted FF filter and to compare it to the predetermined minimum and maximum responses at three distinct frequencies that are marked as the bold vertical lines in FIG. 8. In this example, the adapted FF filter is closer to the low leak response, indicating a leakage condition that is slightly above the minimum. From this, a leakage value quantifying the leakage condition may be determined, for example as a value between 0 and 1, with 0 indicating the minimum and 1 corresponding to the maximum leakage condition.

Moreover, the adaptation engine ADP may be configured to detect and evaluate a ratio of the energy at the FB microphone FB_MIC relative to the energy at the FF microphone FF_MIC, and to determine an accuracy of the estimated leakage value from this ratio. Typical error margins of the leakage value are in the order of 5%, which constitutes sufficient accuracy for setting an FB filter based on the leakage value. If the leakage value's accuracy is below a certain threshold, the adaptation engine ADP may be configured to suspend the FB ANC, for example.

The invention claimed is:

1. An audio system for an ear mountable playback device comprising a speaker;

an error microphone configured to sense sound being output from the speaker and ambient sound;

a further microphone configured to predominantly sense ambient sound;

a first noise filter coupling the further microphone to the speaker;

a second noise filter coupling the error microphone to the speaker; and an adaptation engine configured to adapt a response of the first noise filter depending on error signals from at least the error microphone;

estimate a leakage condition from the response of the first noise filter; and adapt a response of the second noise filter depending on the estimated leakage condition; and wherein the adaptation engine is configured to estimate the leakage condition by comparing the adapted response of the first noise filter to a predetermined minimum and/or maximum response.

2. The audio system according to claim 1, wherein comparing the adapted response of the first noise filter to the predetermined minimum and/or maximum response is performed in the frequency domain.

3. The audio system according to claim 1, wherein the adaptation engine is configured to estimate the leakage condition at one or more distinct frequencies or frequency ranges.

4. The audio system according to claim 1, wherein the adaptation engine is configured to estimate the leakage condition by determining a leakage value.

5. The audio system according to claim 4, wherein the adaptation engine is further configured to estimate the leakage condition by estimating at each of a set of distinct frequencies or frequency ranges an interim leakage value based on an amplitude value of the response of the first noise filter within a range that is defined by predetermined minimum and maximum responses at the respective distinct frequency or frequency range; and calculating the leakage value from the interim leakage values.

6. The audio system according to claim 1, wherein the adaptation engine is configured to adapt the response of the second noise filter by setting one of a set of predefined filters as the second noise filter.

7. The audio system according to claim 1, further comprising a combiner configured to generate the response of the second noise filter based on a combination of an output of a first interpolation filter amplified with a first adjustable gain factor and an output of a second interpolation filter amplified with a second adjustable gain factor; and wherein the adaptation engine is further configured to adapt the response of the second noise filter by adjusting at least one of the first and the second adjustable gain factors.

8. The audio system according to claim 1, which is configured to perform noise cancellation.

9. The audio system according to claim 1, wherein the further microphone is a feedforward error microphone and the first noise filter is of a feedforward noise cancellation type; and the error microphone is a feedback error microphone and the second noise filter is of a feedback noise cancellation type.

10. The audio system according to claim 1 wherein the leakage condition characterizes a leak between an ambient of the audio system and a volume which is defined by an ear canal of a user and a cavity of the audio system, wherein the cavity is arranged at a preferential side for sound emission of the speaker.

11. The audio system according to claim 1, further comprising a proximity sensor configured to detect a proximity between the audio system and an ear canal of a user; wherein the adaptation engine is further configured to estimate the leakage condition from the response of the first noise filter and the proximity.

12. The audio system according to claim 1, which includes the playback device.

13. The audio system according to claim 1, wherein the playback device is a headphone or an earphone.

14. The audio system according to claim 1, wherein the adaptation engine is configured to adapt the response of the second noise filter such that a stable operation of the response of the second noise filter is maintained.

15. The audio system according to claim 1, wherein the further microphone detects a negligible level of the sound output from the speaker.

16. The audio system according to claim 1, wherein the error microphone detects a negligible level of the ambient sound.

17. An audio system for an ear mountable playback device comprising a speaker;

an error microphone configured to sense sound being output from the speaker and ambient sound;

a further microphone configured to predominantly sense ambient sound;

a first noise filter coupling the further microphone to the speaker;

a second noise filter coupling the error microphone to the speaker; and an adaptation engine configured to adapt a response of the first noise filter depending on error signals from at least the error microphone;

estimate a leakage condition from the response of the first noise filter; and adapt a response of the second noise filter depending on the estimated leakage condition; and wherein the adaptation engine is further configured to compare a signal level of the further microphone to a signal level of the error microphone; and based on the comparison of the signal levels evaluate an accuracy of the estimated leakage condition.

18. The audio system according to claim 17, wherein the adaptation engine is further configured to activate and deactivate the second noise filter depending on the accuracy of the estimated leakage condition.

19. A signal processing method for an ear mountable playback device comprising a speaker, an error microphone that predominantly senses sound being output from the speaker, and a further microphone that predominantly senses ambient sound, the method comprising generating an error signal with the error microphone;

adapting a response of a first noise filter coupled between the further microphone and the speaker depending on at least the error signal;

estimating a leakage condition from the response of the first noise filter by comparing the adapted response of the first noise filter to a predetermined minimum and/or maximum response; and adapting a response of a second noise filter coupled between the error microphone and the speaker depending on the leakage condition.

* * * * *